No. 764,044. PATENTED JULY 5, 1904.
C. DIESLER.
PROCESS OF SMELTING AND REDUCING METALS.
APPLICATION FILED JAN. 12, 1901.
NO MODEL.
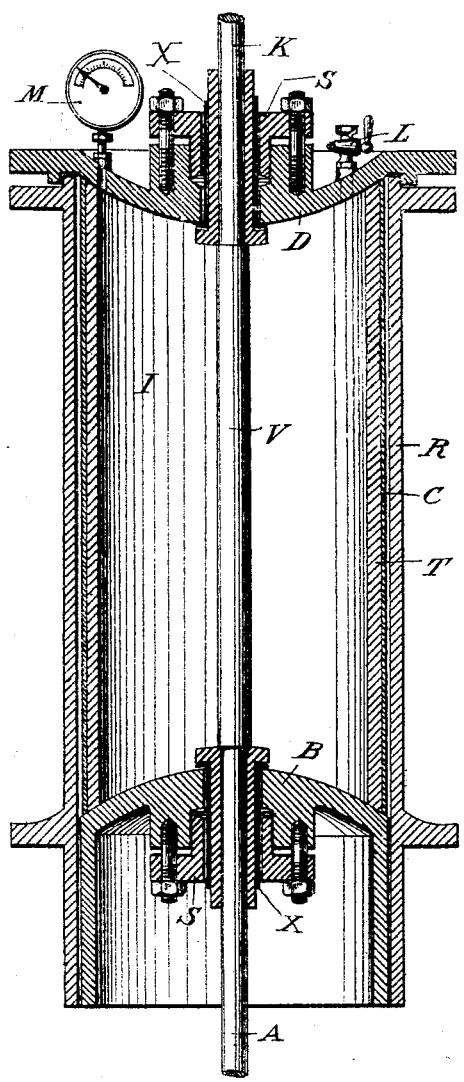

No. 764,044.

Patented July 5, 1904.

UNITED STATES PATENT OFFICE.

CHRISTIAN DIESLER, OF COBLENTZ, GERMANY.

PROCESS OF SMELTING AND REDUCING METALS.

SPECIFICATION forming part of Letters Patent No. 764,044, dated July 5, 1904.

Application filed January 12, 1901. Serial No. 42,942. (No specimens.)

*To all whom it may concern:*

Be it known that I, CHRISTIAN DIESLER, a subject of the German Emperor, and a resident of Coblentz, Germany, have invented certain new and useful Improvements in Processes of Reducing Metals, of which the following is a specification.

The object of my present invention is to provide a process which consists in heating the materials to be reduced in tightly-closed ovens or furnaces, the heat to be supplied by the action of an electric current in which a suitable resistance medium is placed and by the action of gases evolved from some one or more of the materials used in the furnace or being reduced.

The principle involved in my invention is based on the well-known fact that carbonates of metals are smelted in an air-tight furnace at a much lower temperature than in an open furnace, and while the oxids require a higher temperature than the carbonates they are also smelted at a lower temperature in a closed receptacle than in an open one, and upon the further fact that the pressure produced by the gases evolved by the heat facilitates the combination and reduction of the materials treated.

The results of my improved process may be generally stated as follows: (*a*) the production of carbonic gases from the carbonates under treatment, said gases possessing a high heating power, which is utilized for reduction purposes on the other materials being treated; (*b*) the production and maintenance within the furnace of so high a gas-pressure that combination and reduction may be effected in a short time at a comparatively low temperature through the aid of an electric current.

As an illustration of the application of my process to produce calcium carbid eighteen hundred kilograms of carbonate of lime and seven hundred kilograms of charcoal heated in an air-tight cylinder from which the air has been withdrawn, the heat initially being produced by an electric current in which there is a suitable resistance medium within the cylinder, will produce one thousand kilograms of calcium carbid and fifteen hundred kilograms of carbonic gas. The heat produced at the resistance medium is so intense that the carbonic acid contained in the carbonate of calcium is separated therefrom and converted into carbon monoxid. The reducing powers of carbon monoxid are well known, and this is greatly augmented by the pressure produced by the evolved gases, which latter are maintained up to a certain degree within the cylinder, which is further increased in efficiency by the heat of the electric current.

In carrying into effect my process metallic oxids and carbonates should not be employed in a finely divided or comminuted form, but should be treated in coarse fragments, while coal and mineral silicates mixed with the metals should be in a finely-divided condition. The reaction will be facilitated when the materials to be treated are compactly pressed in the furnace or other receptacle.

In the accompanying drawing I have shown a preferred form of furnace for carrying out my process, the figure being a vertical section taken through the center of the furnace.

Referring to the drawing in detail, R represents a cylindrical iron casing having removably-secured arched metal cover D and bottom B. Arranged within the casing R and suitably spaced therefrom is an inner casing T, made of vitrified clay or other heat-resisting and non-conducting material, which is surrounded by a metal casing *c*, between the walls of which and the cylinder R is left a space, which may be filled in with asbestos or other suitable packing. (Not shown.) The cover and bottom are provided with central openings, into which are respectively inserted the electrodes K and A, stuffing-boxes S with asbestos sleeves X forming tight joints about the electrodes. These electrodes, it will be understood, are connected with any suitable source of electric energy or current exteriorly of the cylinder and within the latter are electrically connected by means of the carbon resistance V.

To fill and operate the apparatus described, the suitable mixture of coal and carbonate in the forms set forth is compressed into the chamber formed by the cylinder T and around the resistance V. The cover with the cathode K is mounted in place and the joints tightly closed. The air is then withdrawn from the cylinder by means of a suitable air-pump attached to the cock L (said air-pump not being shown, as it forms no part of the apparatus *per se*) and the current turned on.

M indicates a manometer attached to the cylinder, and L is a cock through which the excess gases evolved within the cylinder may be drawn off from time to time. It will be understood that the gases are utilized up to a pressure of eighteen to twenty atmospheres within the furnace to facilitate the reduction of the materials treated, while the excess may be carried off for such use as may be desired.

Having fully described my invention, what I claim, and desire to secure by Letters Patent, is—

1. The process of smelting and reducing metals, consisting in mixing the materials to be treated with carbonate of lime and carbon, placing the mixture in an air-tight retort, exhausting the air from the retort, subjecting the mass to the action of an electric current within the retort and to the action of the gas generated therein in excess of five atmospheres of such gas, and exhausting such resultant gas after it has acted on the materials treated.

2. The within-described process, consisting in compressing metallic salts in powdered form in retorts from which the air is exhausted and subjecting said salts to the action of a strong electric current with a suitable resistance in circuit within the retort, and also to a pressure of the gas evolved from the reaction within the retort, such pressure to exceed five atmospheres of the evolved gas.

In testimony whereof I have hereunto set my hand in presence of two witnesses.

CHRISTIAN DIESLER.

Witnesses:
C. ACKER,
GREGORY PHELAN.